Feb. 10, 1925.
C. E. RETT
1,526,012
METHOD OF MANUFACTURING CUSHION TIRES
Filed Jan. 18, 1924
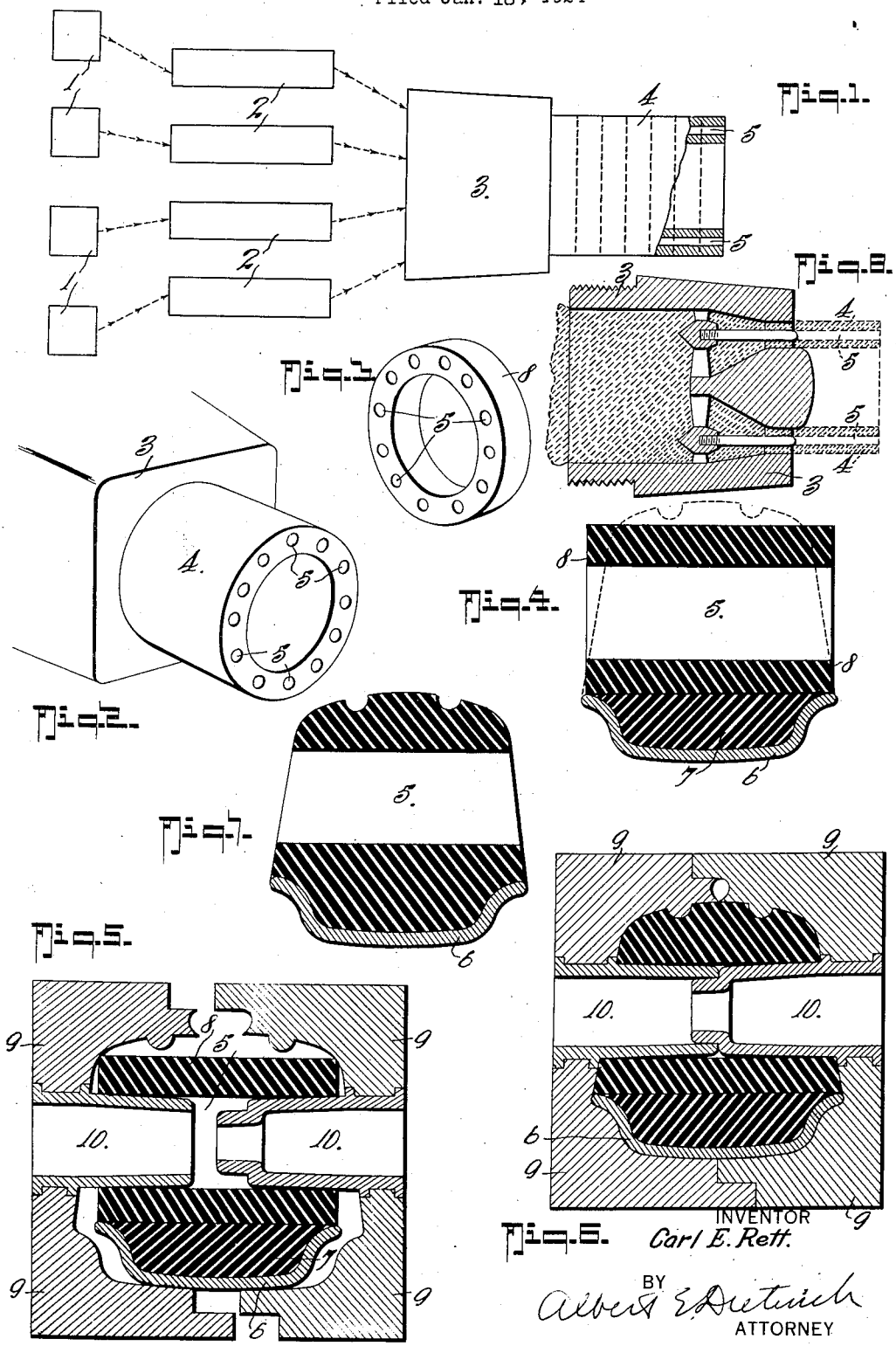
INVENTOR
Carl E. Rett.
BY
Albert E. Dietrich
ATTORNEY Patented Feb. 10, 1925.

1,526,012

UNITED STATES PATENT OFFICE.

CARL E. RETT, OF AKRON, OHIO, ASSIGNOR TO LAMBERT TIRE & RUBBER CO., OF BARBERTON, OHIO, A CORPORATION OF ARIZONA.

METHOD OF MANUFACTURING CUSHION TIRES.

Application filed January 18, 1924. Serial No. 687,059.

*To all whom it may concern:*

Be it known that I, CARL E. RETT, a citizen of the United States, residing at Akron, in the county of Summit and State of Ohio, have invented certain new and useful Improvements in Methods of Manufacturing Cushion Tires, of which the following is a specification.

My invention relates to the art of manufacturing cushion tires of the ventilated type, i. e., tires composed of solid rubber with holes or passages transversely through the same. At present there are essentially two principal methods employed in the manufacture of cushion tires of this type, one being to take a rim, build up the tire on the rim complete by winding bands or sheets of rubber circumferentially around the rim, interposing transverse rubber blocks at proper intervals to locate the transverse holes and then placing the built up mass in a mold and vulcanizing the same into an integral structure; the other method is to die-express the rubber from a tube machine in a longitudinal strip of the desired cross section of the tire, cut the strip and wind it around the rim once, putting the ends together, and either placing the mass in a mold or wrapping the same and then vulcanizing the mass in the mold. Both of these methods are objectionable in that the labor cost is considerable and because of the difficulty of gaging the quantity of rubber to a nicety in order to avoid waste caused by the excess rubber oozing out of the mold as it closes, and the difficulty of effecting a perfect union of the lapped ends of the die-expressed strip to hold the strip in place while it is being located in the mold and the mold is being closed over the mass. With the die-expressed-strip method there is also some danger of the jointed ends in not becoming thoroughly vulcanized together into a perfect union, a defect which might cause separation of the body, in use as a tire.

It is to overcome the objections above noted and to produce a tire at a low labor cost that my present process has been developed.

In the drawing accompanying this specification I have diagrammatically illustrated the manner of carrying out my invention. Referring to the drawing it will be seen that:

Figure 1 is a diagrammatic view of the apparatus employed to form the rubber tube from which the tire blanks are cut.

Figure 2 is a diagrammatic perspective view of the die with the rubber tube issuing therefrom.

Figure 3 is a detail perspective view of a section of the rubber tube cut off and constituting the tire blank.

Figure 4 is a cross section of the tire blank after it has been placed on the filled rim.

Figure 5 is a view illustrating the rim and blank in the shaping and vulcanizing mold before the same is completely closed.

Figure 6 is a view similar to Figure 5 with the mold fully closed and showing the displacement of the rubber to fill the mold.

Figure 7 is a cross section of the finished tire.

Figure 8 is a vertical longitudinal section of the parts shown in Figure 2, the rubber being shown in dot and dash cross section.

In the drawing 1 indicates the rubber mill or mills from which the worked rubber is directed to one or more tube machines 2 and from which the rubber is in turn forced through a die 3 which gives the required cross section form to the rubber as it issues from the die in the form of a tube 4, it being understood that the die is provided with means to form the holes 5 in the tube 4 which will be later referred to. 6 is the rim and 7 the rim filler, the latter being formed in any desired way, as for instance by the die-expressed longitudinal strip method.

The tire blank 8, shown in Figure 3, is obtained by cutting a portion of the tube 4 from the remainder, the portion being of such width as may be necessary to produce a tire of predetermined size, or in other words, a ring 8 of sufficient rubber is cut off from the tube 4 to fill the molds of the particular sized tire desired.

The mold may be of the usual construction, one form being illustrated in Figures 5 and 6 by reference to which it will be seen that the side plates 9 have lugs 10 to enter the holes 5 of the blank and keep them from closing up during the closing of the molds and the vulcanization of the rubber.

In carrying out my process I run the rubber from the mills 1 into one or a battery of tube machines 2 from which the rubber is delivered to or caused to pass through a common head or die 3 and express the material in the form of a tube or cylinder, the diameter of which depends upon the size of the tire to be produced. The die has provisions for forming the vent holes 5 as tunnels through the cylinder wall parallel with the axis of the expressed cylinder.

From the cylinder, either as it issues from the die or later, is cut, in planes at right angles to its axis, bands or rings of the width necessary to make a tire of a given width or size; these rings or bands which constitute the tire blanks are then placed over the rims and the rims and rings are put in the molds, it being understood that preferably the rim is first filled with a strip of rubber and then the tire blank is placed on the same. The molds are then closed with the pins in register with the holes in the band or blank. The closing of the molds as shown in Figures 5 and 6 displaces the rectangular-cross-section of the blank and causes the rubber to be squeezed to fill the mold chamber and assume the contour of the finished tire. The mold and its contents are then put into a vulcanizing kettle and the mass vulcanized as is the usual practice, after which the mold is removed from the carcass and the finished tire is the result.

As a modification of my method the vent holes may be omitted from the tube 4 and a blank or solid wall rubber cut from the tube and placed in the vulvanizing molds, the pins of the molds being forced into the tube blank as the mold closes to form the vent holes, it being understood that when this modification of the method is employed a lesser width blank is used, owing to the displacement of the rubber where the holes are formed, the amount being gauged so that when the molds are completely closed the rubber will just fill the mold cavity without sufficient excess being present to produce a material ooze or overflow.

The essential feature of my invention is the forming of the tire blank from a tube section so that the blank will be made as an integral unbroken ring.

From the foregoing description, taken in connection with the accompanying drawing, it is thought the complete construction and advantages of my invention will be clear to those skilled in the art.

No claim is made in this application to the structure of the die 3 which is shown purely for purposes of illustration.

What I claim is:

1. The method of manufacturing tires which consists in die-expressing a cylinder of rubber of a definite diameter, cutting a tire ring-blank from the cylinder, placing the blank on a rim, shaping the blank on the rim to the form and size desired and vulcanizing the mass while held in shape.

2. The method of manufacturing tires which consists in forming a cylinder of rubber of approximately the diameter of a tire, cutting a tire ring-blank from said cylinder, placing said blank on a rim, placing the rim and blank in a forming and vulcanizing mold and vulcanizing the mass while held in the mold.

3. The method of manufacturing cushion tires of the transverse hole type, which consists in die-expressing a cylinder of rubber with holes in the wall parallel to the axis of the cylinder, cutting the cylinder transversely into tire blanks, placing a blank on a rim, placing the rim and blank in a shaping mold and while therein contained vulcanizing the mass.

4. The method of manufacturing tires which consists in forming a seamless cylinder of rubber of approximately the diameter of a tire, cutting the cylinder in planes normal to the axis thereof into widths to constitute tire blanks, placing the blank in a mold to shape the same to the cross section of a tire and vulcanizing the mass in the mold.

5. The method of manufacturing tires which consists in taking a rim, filling it with a base structure, die-expressing a seamless-band blank, placing the blank on the base structure of the rim, shaping the blank to the desired cross sectional form and vulcanizing the mass.

6. The method of manufacturing tires which consists in taking a rim, filling it with a base structure, die-expressing a seamless-band blank, placing the blank on the base structure of the rim, shaping the blank to the desired cross sectional form while on the rim and vulcanizing the mass while on the rim.

7. The method of manufacturing tires which consists in taking the rubber from the mills, passing it through tube machines and forcing it through a die having a ring or band-like opening to cause the issuing rubber to take the form of a tube, severing the tube transversely into bands of desired width to constitute tire blanks, placing the blanks on the rims and molding the blanks while on the rims to the desired form and vulcanizing the rubber in its molded condition.

CARL E. RETT.